Patented May 11, 1948

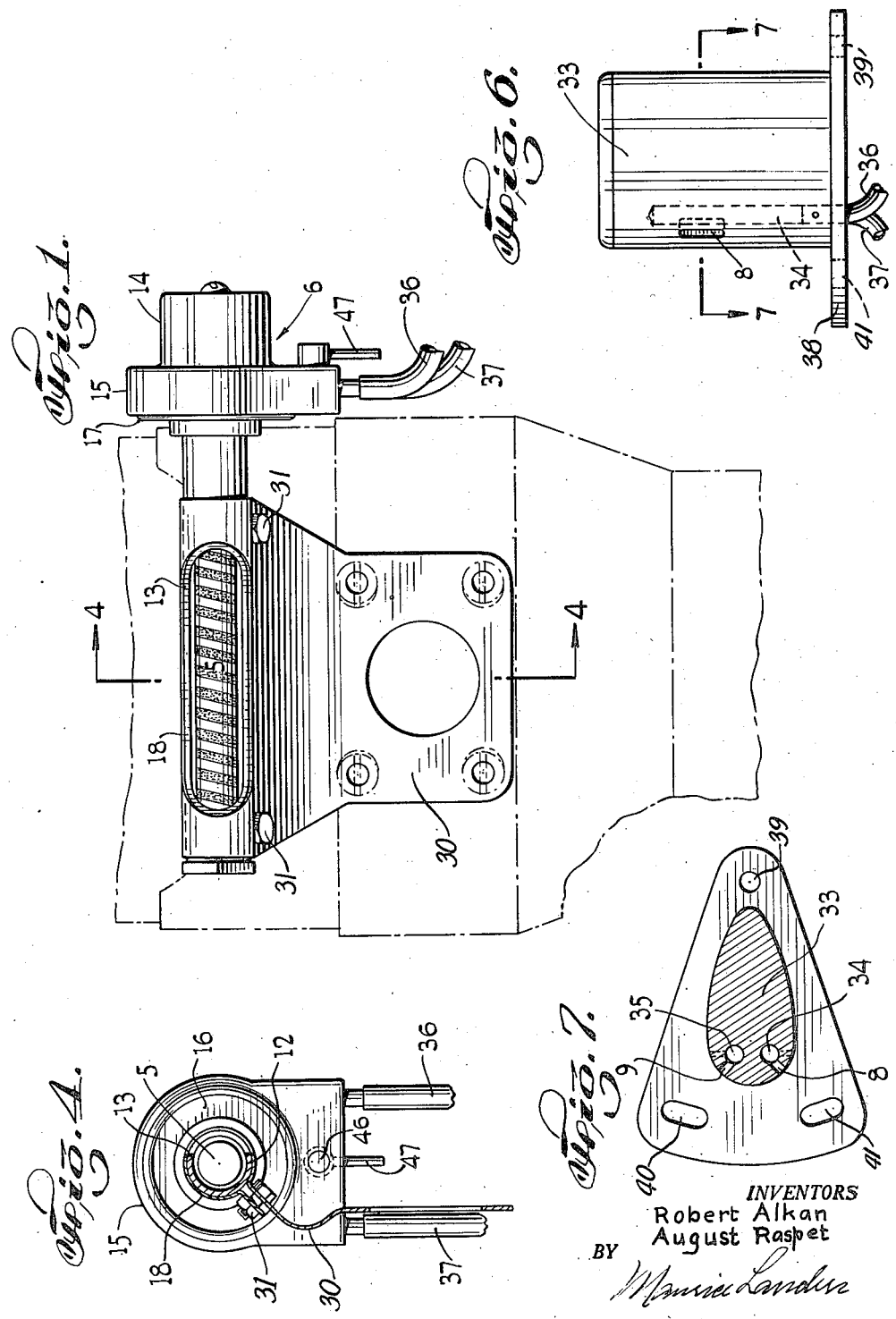

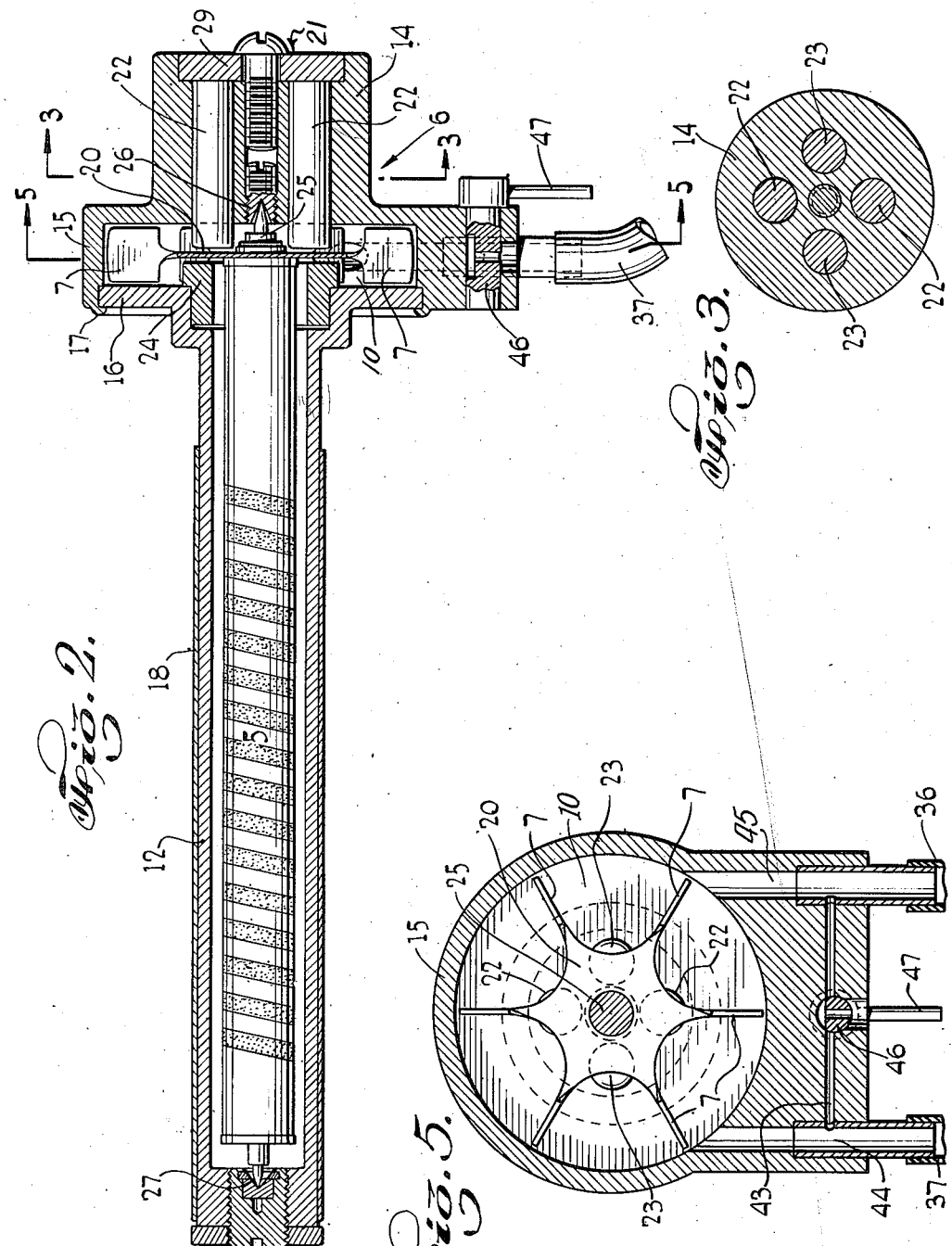

2,441,306

UNITED STATES PATENT OFFICE 2,441,306

SKID INDICATOR FOR AIRCRAFT

Robert Alkan and August Raspet, Locust Valley, N. Y., assignors to Specialties, Inc.

Application February 5, 1945, Serial No. 576,252

8 Claims. (Cl. 73—180)

The present invention has for an object to provide an improved skid indicator for aircraft.

Various conditions of aircraft flight cause lateral movement due to yaw, slip or skid which is not easily detected by a pilot in a closed cockpit especially when the skid is relatively slight. Skid which is too slight to be significant so far as the normal flight of the aircraft is concerned, may be very important in a military aircraft dropping bombs or operating guns, rocket launchers or the like. Furthermore, the pilot of military craft must maintain his attention concentrated on accurate control of his airplane and guns and if he is to maintain an awareness of lateral skid, it is important that he should have a skid indicator which does not require more than a minimum of attention to make his observations.

The present invention aims to provide a skid indicator which is easily observed by the pilot while requiring a minimum of distraction of his attention from his sight and target. It is a further object of the invention to provide a skid indicator which, while easily observable for the pilot, will give the pilot an indication of both the direction of skid and the speed of skid.

The invention has for an object also to provide damping means for the movable element of the indicator which will insure prompt response to changes in direction or speed of skid and which will inhibit rotation when the speed of rotation is rapid enough to cause blur and to make reading of the instrument difficult.

The nature and objects of the invention will be better understood from a description of an illustrative embodiment thereof for the purposes of which description reference should be had to the accompanying drawings forming a part hereof and in which Figure 1 is a front view of a skid indicator applied to a sight as viewed by the pilot indicating also diagrammatically the air tube connections to the yaw-head.

The sight is indicated in dot and dash lines to show the relative position of the skid indicator visible through the sight glass.

Fig. 2 is a sectional view of the indicator unit drawn to a larger scale.

Fig. 3 is a sectional view taken on the line 3—3 of Fig. 2.

Fig. 4 is a central sectional view taken on the line 4—4 of Fig. 1.

Fig. 5 is a detailed sectional view taken on the line 5—5 of Fig. 2.

Fig. 6 is a side view of a conventional yaw-head used with the indicator.

Fig. 7 is a sectional view taken on the line 7—7 of Fig. 6.

In the selected embodiment shown in the drawings for the purposes of illustrating the principles of the invention a cylindrical skid indicating telltale element 5 is mounted in a suitable supporting casing in the field of vision of the pilot to indicate by its rotation in one direction or the other the direction of skid of the aircraft and by its speed of rotation the relative speed of skid. This telltale is rotated by a vane type air motor 6, the vanes 7 of which are engaged by a current of air from one or the other of two forwardly presented dynamic pressure air tubes 8 and 9 which are mounted in a substantially horizontal plane in the aircraft and are directed more or less laterally in opposite directions from the normal direction of flight of the aircraft. As indicated in Fig. 7, these dynamic pressure tubes are formed in one integral yaw-head and extend forwardly and outwardly at an angle of about 45 degrees to the flight axis. Dynamic pressure tubes are indicated and described as one of the known means for obtaining an air current for the purposes indicated but obviously other means for accomplishing the same purpose may be substituted. When, due to skid or yaw, the movement of the plane is diagonal to the normal line of flight, then one tube or the other will receive a higher pressure of air and consequently a current of air will flow through one of the tubes 8 or 9 and the connecting conduits into the chamber 10 of the casing and against the vanes 7 to cause rotation of the motor and the skid indicator element 5 to which the motor rotor is rigidly attached. It is to be noted that in the preferred construction illustrated in the drawing, the telltale rotates continuously in one direction or the other when indicating skid in one direction or the other thereby giving the pilot an indication by the apparent right and left movement of the lines. This provides a different type of indicator than those shown in various devices of the prior art which indicate skid by their position as contrasted with a continuing movement. The terms "rotate" and "rotation" as used in the claims are intended to define this type of continuing movement and to distinguish from a mere swinging about a pivot. It is to be noted that the air pressures of the two dynamic pressure tubes act in opposition to each other against opposite sides of the vanes. The air current may flow forward in the tube of lesser pressure if desired or other provision may be made for the escape of the air.

The telltale 5 is suitably marked for visual observation by the pilot. A helical marking in black and white has been found convenient and effective. Such marking gives the appearance of parallel lines visible to the pilot moving to the right or left as the pilot sees the indicator within his field of vision while looking through the sight. The white line may be luminous if desired in order to be visible in the dark.

The casing for the telltale comprises a tubular member 12 having a window 13 and a recessed head member 14 providing a motor housing 15 which receives and is spun over the flange 16 of the tubular member as indicated at 17, together with a transparent plastic tube 18 fitting the member 12. The window portion of the plastic tube may be flat to avoid reflections or of lens shape to magnify in one direction the telltale marking.

The motor 6 comprises a disc 20 of aluminum or other nonmagnetic material of good electrical conductivity, rigidly secured to the end of the telltale 5 and having edge portions twisted and formed to provide the vanes 7.

In order to provide damping means to inhibit overrunning and high speed rotation of the rotatable member including the telltale and rotor disk 20, a permanent magnet 21 is fixed in the casing member 14 with north and south pole portions 22 and 23 closely adjacent the disc 20. Preferably also an annular armature 24 is fixed in the casing close to the opposite face of the disc 20. Between their opposed faces the disc 20 of the vane motor rotates. At low speeds of rotation the magnetic lines of force between the permanent magnet 21 and the armature 24 have less damping effect but as the speed increases toward the point at which the rapid rotation would cause blurring, the damping effect becomes very effective. The telltale responds quickly to any reduction of pressure or reversal of flow of the air current partly because of the magnetic damping and partly because the vanes are relatively large as compared to the mass of the rotor.

The shaft 25 of the rotatable telltale element 5 is mounted in jewel bearings 26, 27 for free rotation.

The magnet comprises four permanently magnetized bars 28 two of which are positioned with north ends 22 toward the rotor and two of which are positioned with their south ends 23 toward the rotor. A soft iron cap 29 acts as a retainer for the magnet bars and completes the magnetic circuit.

The skid indicator unit fits in a bracket 30 in which it is held by clamp bolts 31. The bracket 30 is arranged to be secured to the rear of a sight unit to hold the indicator suitably within the range of vision of the pilot while interfering very little with his field of view through the sight.

The yaw-head is shown in Figs. 6 and 7. As shown it comprises a streamlined head 33 having the two dynamic pressure tubes 8 and 9 formed therein and connecting respectively with passageways 34 and 35 to which suitable conduits 36 and 37 are connected to lead the air currents to the vane type motor. The dynamic pressure tubes are shown as slots having a substantial length longitudinally of the yaw-head to permit air currents of substantial volume while at the same time, the width of the tube is narrow circumferentially of the yaw-head.

The yaw-head is formed with a flange 38 for attachment to the wing of the airplane or other suitable support. The flange is formed with a round hole 39 for a securing screw serving as a pivotal point of support and with two screw slots 40 and 41 arranged concentric with the point of pivotal support to permit adjustment.

The instrument so far described is sensitive to yaw of a fraction of a degree and for satisfactory operation, it is necessary that the yaw-head providing the two dynamic pressure tubes be set parallel to the effective line of flight of the aircraft with corresponding accuracy. In order to overcome the difficulties involved in accurately positioning the yaw-head on the aircraft, means is provided for modifying the effect of the current of air coming from one of the pressure tubes until, when flying the aircraft in a straight line with as little yaw as possible, the skid indicator will either stand still or oscillate equally in opposite directions. Rather than restrict one air passage, an arrangement is preferred in which air is bled from one air passage or the other as may be necessary to obtain a zero indication when the aircraft is flying in a straight line in still air.

As shown in Fig. 5, a small cross-passage 43 between the two passages 44 and 45 and a three-way valve 46 provided for releasing air coming from one or the other of the tubes 44 and 45. In order to set the valve 46 at the proper zero position to provide a neutral indication by the skid indicator, the craft is flown by the pilot in as straight a line as possible in still air and the valve is set by means of the handle 47 to provide zero indication.

The foregoing particular description of a selected embodiment is illustrative merely and is not intended as defining the limits of the invention.

We claim:

1. A skid indicator for aircraft comprising in combination, a tubular casing having a window in one side, a rotatable cylindrical member having a helical surface exposed to view through said window, means for rotating said cylindrical member in one direction or the other comprising an electrically conducting disc having vanes formed at its outer periphery secured to said rotatable cylindrical member, a magnet and an armature fixed in said casing and between which the disc rotates, means including a yaw-head aligned in the direction of normal flight of the aircraft and arranged to lead air currents against said vanes to rotate the rotatable element in one direction or the other.

2. A skid indicator for aircraft comprising a rotatable telltale element adapted to indicate by continuing rotation the direction of lateral skid, an air motor connected to rotate the telltale element, a pair of pressure tubes directed somewhat laterally to opposite sides of the normal direction of flight and means leading a current of air from said tubes to the motor to control its direction of rotation and means for modifying the effect of the air current coming from one tube to provide a zero reading.

3. A skid indicator for aircraft comprising a rotatable telltale element adapted to indicate by continuing rotation the direction of lateral skid, an air motor connected to rotate the telltale element, a pair of pressure tubes directed somewhat laterally to opposite sides of the normal direction of flight and means leading air from the pressure tubes to the motor to rotate it in either direction and means for modifying the effective pressure at the motor of air coming from one of the pressure tubes in order to make correction for errors of alignment.

4. A skid indicator for aircraft comprising, in combination, a telltale adapted to be positioned in the field of vision of a pilot, an air motor connected to said telltale, a yaw-head having a pair of tubes adapted to lead air to said motor in one direction or the other in accordance with the direction of skid to actuate the motor, and means yieldably inhibiting the movement of the telltale and a valve adapted to bleed more or less air from one of the tubes to adjust the indicator.

5. A skid indicator for air aircraft comprising, in combination, a rotatable telltale adapted to be positioned in the field of vision of a pilot and to indicate by continuing rotation the direction and extent of lateral skid, an air motor connected to said telltale, a yaw-head having a pair of tubes arranged to lead air to said motor to actuate the motor in one direction or the other in accordance with the direction of skid, means yieldably inhibiting the movement of the telltale, and a cross conduit and valve to control escape of air from one or the other of the tubes.

6. A skid indicator for aircraft comprising a horizontal rotatable helical telltale adapted to be mounted with its axis transverse to the pilot's line of sight to indicate, by continuous rotation in either direction, lateral skid of the aircraft, an air motor connected to one end of the telltale to rotate it and a yaw head comprising a pair of pressure tubes leading a current of air to the motor to control its direction and speed of rotation substantially as described.

7. A skid indicator for aircraft comprising in combination a tubular casing having a window in one side, a rotatable cylindrical telltale mounted in the casing and having a helical surface exposed to view through said window, an air motor directly connected to said rotatable telltale for rotating it continuously in one direction or the other, means including a yaw head and conduits arranged to lead air from the yaw head to said air motor to drive it in one direction or the other in accordance with the direction of air flow relative to the yaw head.

8. A skid indicator for aircraft comprising a horizontal rotatable telltale having a helical surface adapted to indicate by continuous rotation in either direction lateral skid of the aircraft, an air motor connected to one end of the telltale to rotate it and a yaw head comprising a pair of pressure tubes directed somewhat laterally to opposite sides of the normal direction of flight leading a current of air to the motor to control its direction and speed of rotation.

ROBERT ALKAN.
AUGUST RASPET.

REFERENCES CITED

The following references are of record in the file of this patent:

UNITED STATES PATENTS

| Number | Name | Date |
| --- | --- | --- |
| 1,298,494 | Gwinn | Mar. 25, 1919 |
| 1,693,211 | Weaver | Nov. 27, 1928 |
| 2,029,700 | Boykow | Feb. 4, 1936 |
| 2,045,521 | Hertelendy | June 23, 1936 |

FOREIGN PATENTS

| Number | Country | Date |
| --- | --- | --- |
| 133,714 | Great Britain | Mar. 11, 1921 |
| 648,871 | Germany | Aug. 12, 1937 |